United States Patent
Zargari (10) Patent No.: US 7,800,348 B2
(45) Date of Patent: Sep. 21, 2010

(54) MOTOR DRIVE WITH VAR COMPENSATION

(75) Inventor: Navid R. Zargari, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 260 days.

(21) Appl. No.: 11/943,671

(22) Filed: Nov. 21, 2007

(65) Prior Publication Data

US 2009/0128083 A1 May 21, 2009

(51) Int. Cl.
*G05F 1/70* (2006.01)
(52) U.S. Cl. ............................. 323/207; 363/34; 363/37
(58) Field of Classification Search ................. 323/207; 363/34, 37, 96, 135
See application file for complete search history.

(56) References Cited

U.S. PATENT DOCUMENTS

| | | | | |
|---|---|---|---|---|
| 5,010,467 | A * | 4/1991 | Tokiwa et al. | 363/37 |
| 5,666,275 | A * | 9/1997 | Inokuchi et al. | 363/35 |
| 5,808,452 | A * | 9/1998 | Gyugyi et al. | 323/207 |
| 5,808,880 | A * | 9/1998 | Marvin | 363/37 |
| 5,877,707 | A | 3/1999 | Kowalick | |
| 6,009,356 | A | 12/1999 | Monroe | |
| 6,167,358 | A | 12/2000 | Othmer et al. | |
| 6,186,400 | B1 | 2/2001 | Dvorkis et al. | |
| 6,366,483 | B1 * | 4/2002 | Ma et al. | 363/87 |
| 6,392,692 | B1 | 5/2002 | Monroe | |
| 6,496,766 | B1 | 12/2002 | Bernold et al. | |
| 6,545,601 | B1 | 4/2003 | Monroe | |
| 6,885,171 | B2 * | 4/2005 | Karppinen et al. | 323/207 |
| 6,894,606 | B2 | 5/2005 | Forbes et al. | |
| 7,049,953 | B2 | 5/2006 | Monroe | |
| 7,148,660 | B2 * | 12/2006 | Ghosh et al. | 323/207 |
| 7,190,143 | B2 * | 3/2007 | Wei et al. | 318/606 |
| 2006/0044711 | A1 | 3/2006 | Wiseman | |

OTHER PUBLICATIONS

Navid R. Zargari, "A Multilevel Thyristor Rectifier With Improved Power Factor", IEEE Transactions on Industry Applications, vol. 33, No. 5, Sep./Oct. 1997.

* cited by examiner

*Primary Examiner*—Jeffrey L Sterrett
*Assistant Examiner*—Fred E Finch, III
(74) *Attorney, Agent, or Firm*—Fay Sharpe LLP; Alexander R. Kuszewski; John M. Miller (57) ABSTRACT

Apparatus and methods are disclosed for providing VAR compensation using an AC motor drive, in which an off-line motor drive is configured to prevent power transfer to a motor load output, with a line side converter being operated to control a voltage or current in an intermediate circuit for leading or lagging VAR compensation of an AC power system.

13 Claims, 6 Drawing Sheets

MOTOR DRIVE WITH VAR COMPENSATION

FIELD OF THE INVENTION

The present invention relates generally to electrical power conversion and more particularly to motor drives with VAR compensation capabilities.

BACKGROUND OF THE INVENTION

Power conversion systems convert electrical power from one form to another and may be employed in a variety of applications such as motor drives for powering an electric motor using power from an input source. Typically, the power converter is constructed using electrical switches actuated in a controlled fashion to selectively convert input power to output power of a desired form such as single or multi-phase AC of a controlled amplitude, frequency and phase to drive an AC motor according to a desired speed and/or torque profile, often in the presence of varying load conditions. In a typical situation, one or more AC motor drives are connected to an AC power bus or point of common coupling along with other loads where a common AC power source provides current to all these loads via the common bus. The AC drives may be equipped with power factor correction (PFC) apparatus to operate the drive at or near unity power factor. In such systems, however, there are multiple loads connected to the common power connection, and the system as a whole will often not be operating at or near unity power factor, even of the motor drives themselves are power factor corrected. For instance, one load may be operating at a leading power factor while others operate at a lagging power factor, such that even though one or more motor drive loads may operate at or near unity power factor, the overall system does not. In this regard, inductive loads, such as electric motors consume reactive power and capacitors supply reactive power to the system, where the reactive power is characterized in terms of volt-amps reactive or VARs. In the past, system power factor could be controlled to a certain extent by various means, such as by switching banks of capacitors onto the common power connection to cancel inductive load effects (e.g. electric motor loads) or by switching in reactors (inductors) to cancel capacitive loading effects. Dedicated devices, known as static VAR compensators (SVCs), may be connected to the system bus for the purpose of controlling the system power factor. However, these devices occupy space and add to the cost of operating the overall system. Thus, there is a need for improved techniques for controlling the power factor of systems having multiple loads powered by a common power source.

SUMMARY OF INVENTION

Various aspects of the present invention are now summarized to facilitate a basic understanding of the invention, wherein this summary is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter. The present disclosure presents drive systems and techniques for VAR compensation using off-line AC motor drives configured to prevent power transfer to the motor load output while a line side converter in the drive is operated to control a voltage or current in an intermediate circuit for leading or lagging VAR compensation of an AC power system. The disclosure thus presents solutions by which the adverse impact of leading or lagging power factor operation can be addressed for a distributed AC power system as a whole without significant cost impact.

In accordance with one or more aspects of the present disclosure, an AC motor drive is provided, which includes an input and a motor load output, an intermediate circuit with capacitive and/or inductive storage element(s), a line side switching converter connected between the input and the intermediate source, and a machine or load side switching converter between the intermediate circuit and the output. The switches of the line and machine side converters are controlled according to switching signals generated by a dual mode switch control system of the drive which operates in a first mode to drive the motor load according to a motor drive control scheme and in a second mode to perform VAR compensation of the power system at large with the motor stopped. In the VAR control mode, the control system provides machine side switching control signals to prevent power transfer between the intermediate circuit and the output, and generates line side switching control signals to selectively couple the input to the intermediate circuit according to a VAR compensation scheme.

The switch control system may include an input to receive a mode selection signal from an external source, such as a communications network, a user switch, etc., for selectable operation in motor drive or VAR compensation operation according to the mode selection signal. The control system may also be configured to receive a VAR required input and to provide the line side switching control signals based at least partially on the VAR required input when operating in the second mode.

In accordance with other aspects of the disclosure, the drive may be of any suitable form or type, such as a current source inverter (CSI-based) drive with an intermediate circuit comprised of one or more link choke or inductor windings connected in forward and/or reverse current paths between the line and machine side converters. In one such embodiment, the machine side converter is a current source inverter that is provided with appropriate switching control signals in the VAR compensation mode to provide a short circuit between the forward and return current paths to prevent power transfer between the intermediate circuit and the output motor load, with the switch control system providing line side switching control signals to control an amplitude of current circulating through the intermediate circuit.

The various aspects of the disclosure find particular utility in conjunction with medium voltage CSI motor drives which are adapted to provide four quadrant operation in the VAR compensation mode. In this manner, an off-line current source inverter-based AC drive can be advantageously operated to provide VAR compensation operation to regulate the current circulating in the intermediate circuit such that leading, lagging or both leading/lagging VARs can be injected into the power system to compensate for otherwise non-unity system power factor conditions. In this respect, CSI drives having phase controlled thyristor rectifiers in the line side converter may be adapted to provide lagging VARs to the system, while such drives having pulse width modulated (PWM rectifier line side converters may be used for injecting leading or lagging VARs into the system. Furthermore the CSI with phase controlled thyristor rectifier can be of the types known in the industry such as 6Pulse, 12P, or higher pulse number (typically achieved by connecting the input rectifiers through phase shifted secondaries of an input transformer)

In other embodiments, the machine side converter may be a voltage source inverter (VSI), with the intermediate drive circuit including one or more capacitors connected between forward and return current paths thereof. In this implementation, the switch control system provides machine side switching control signals in the VAR compensation mode to cause the machine side converter to disconnect the motor output from the intermediate circuit so as to prevent power transfer between the intermediate circuit and the output, and the line side switching control signals regulate the intermediate circuit capacitor voltage so as to provide leading VAR compensation to the power system.

In accordance with further aspects of the disclosure, the input may include one or more series connected line reactors and/or one or more filter capacitor connected across the input current paths between the AC power source and the line side converter, where such input stage filter capacitors may be delta or wye connected for multi-phase systems.

Other aspects of the disclosure provide a power system VAR compensation method using an AC motor drive, including operating the drive machine side converter to prevent power transfer between the intermediate circuit and the motor load output, and operating the line side converter to control a voltage or current in the intermediate circuit. In addition, the method may include receiving a mode selection signal, wherein the line side and machine side converters are selectively operated for motor drive or VAR compensation operation according to the mode selection signal. The method, moreover, may further include receiving a VAR required input from an external source, with the intermediate circuit voltage or current being controlled at least partially based on the VAR required input.

Operation of the machine side converter in the VAR compensation mode may comprise causing the machine side converter to provide a short circuit between forward and return current paths of the intermediate circuit, where the line side converter is operated to control a current in the intermediate circuit, for example, when the drive is a current source inverter based design. In other aspects of the disclosure, the machine side converter operation includes disconnecting the motor load output from the intermediate circuit, with the line side converter being operated to control a voltage in the intermediate circuit, such as for voltage source type drives. In accordance with further aspects of the disclosure, the method may further comprise receiving a system current feedback signal from an external source, and generating a VAR required signal in the AC motor drive based at least partially on the system current feedback signal, where the line side converter is operated to control a voltage or current in the intermediate circuit based at least partially on the VAR required signal.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the invention will be set forth in the following detailed description when considered in conjunction with the drawings, in which.

DETAILED DESCRIPTION OF THE INVENTION

Referring now to the figures, several embodiments or implementations of the present invention are hereinafter described in conjunction with the drawings, wherein like reference numerals are used to refer to like elements throughout, and wherein the various features are not necessarily drawn to scale.

Figure 1:
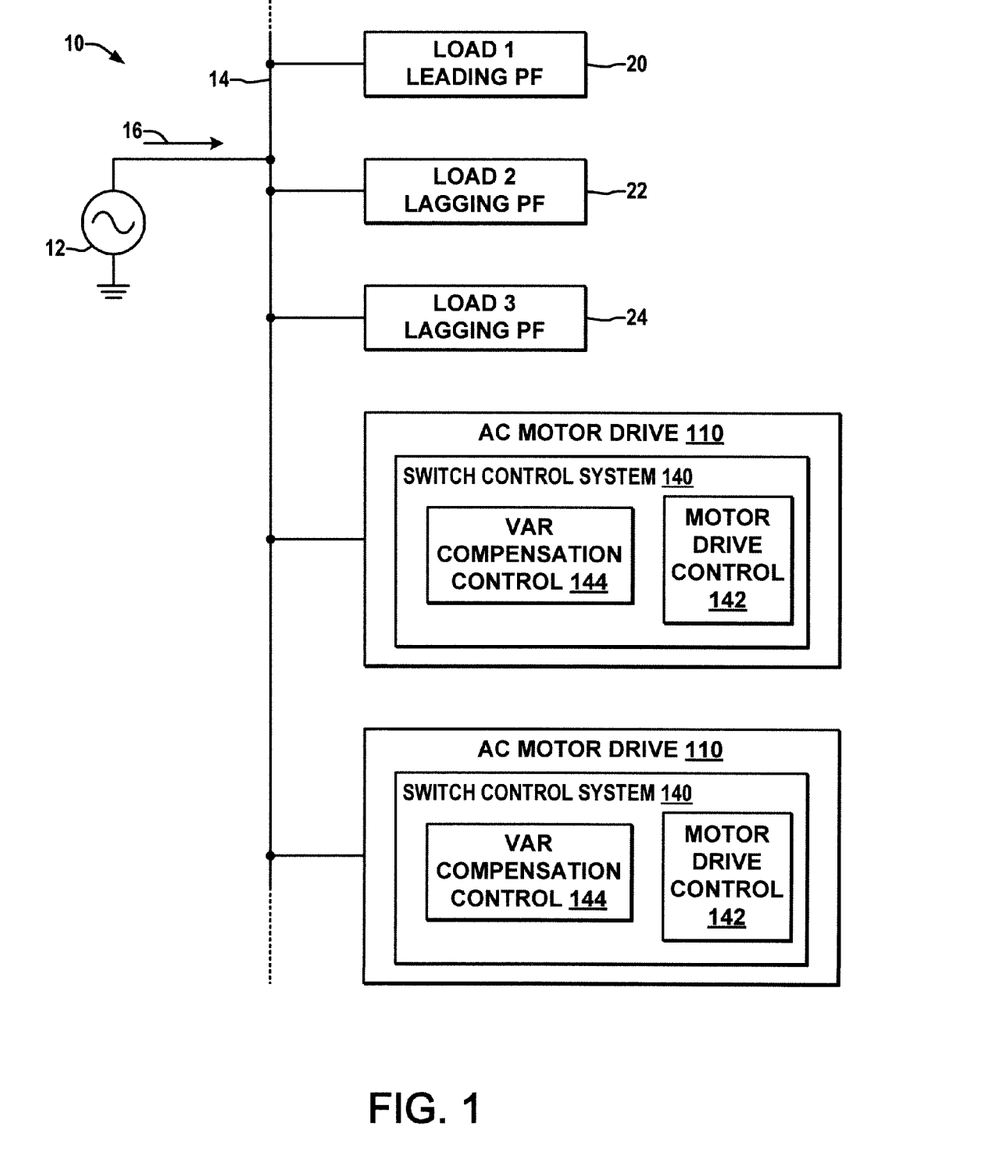
FIG. 1 is a schematic diagram illustrating an exemplary electrical system with multiple loads powered by a common power source including AC motor drives with VAR compensation control features in which various aspects of the disclosure may be employed.

FIG. 1 shows a power system 10 in which AC motor drives 110 are connected to an AC power bus or point of common coupling 14 along with other loads 20, 22, 24, where an AC power source 12 provides current 16 to the common bus 14. The motor drives 110 may be equipped with power factor correction (PFC) apparatus to operate the drive when controlling the associated motor at or near unity power factor. However, the source 12 powers other AC loads 20, 22, and 24 via the common power connection 14, and absent countermeasures the system 10 as a whole will often not be operating at or near unity power factor. For instance, the first load 20 may be operating at a leading factor while other loads 22 and 24 are operating at a lagging power factor, whereby the power factor conditions in the overall system 10 may not be optimal even though the drives 110 may perform power factor correction while driving a motor load.

Figure 2:
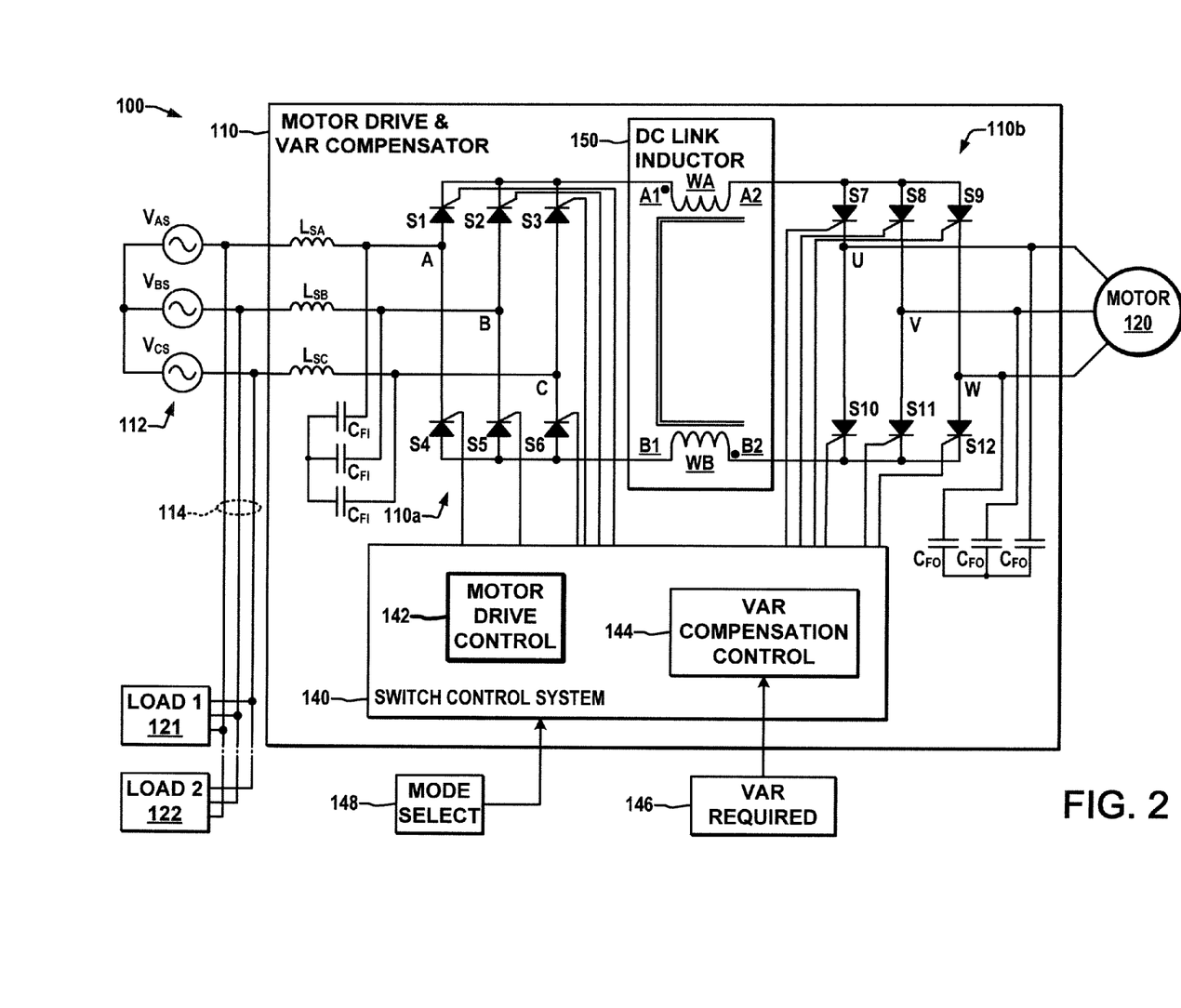
FIG. 2 is a schematic diagram illustrating an exemplary AC motor drive with VAR compensation capabilities operating in a motor drive control mode in accordance with one or more aspects of the present disclosure.
Figure 3:
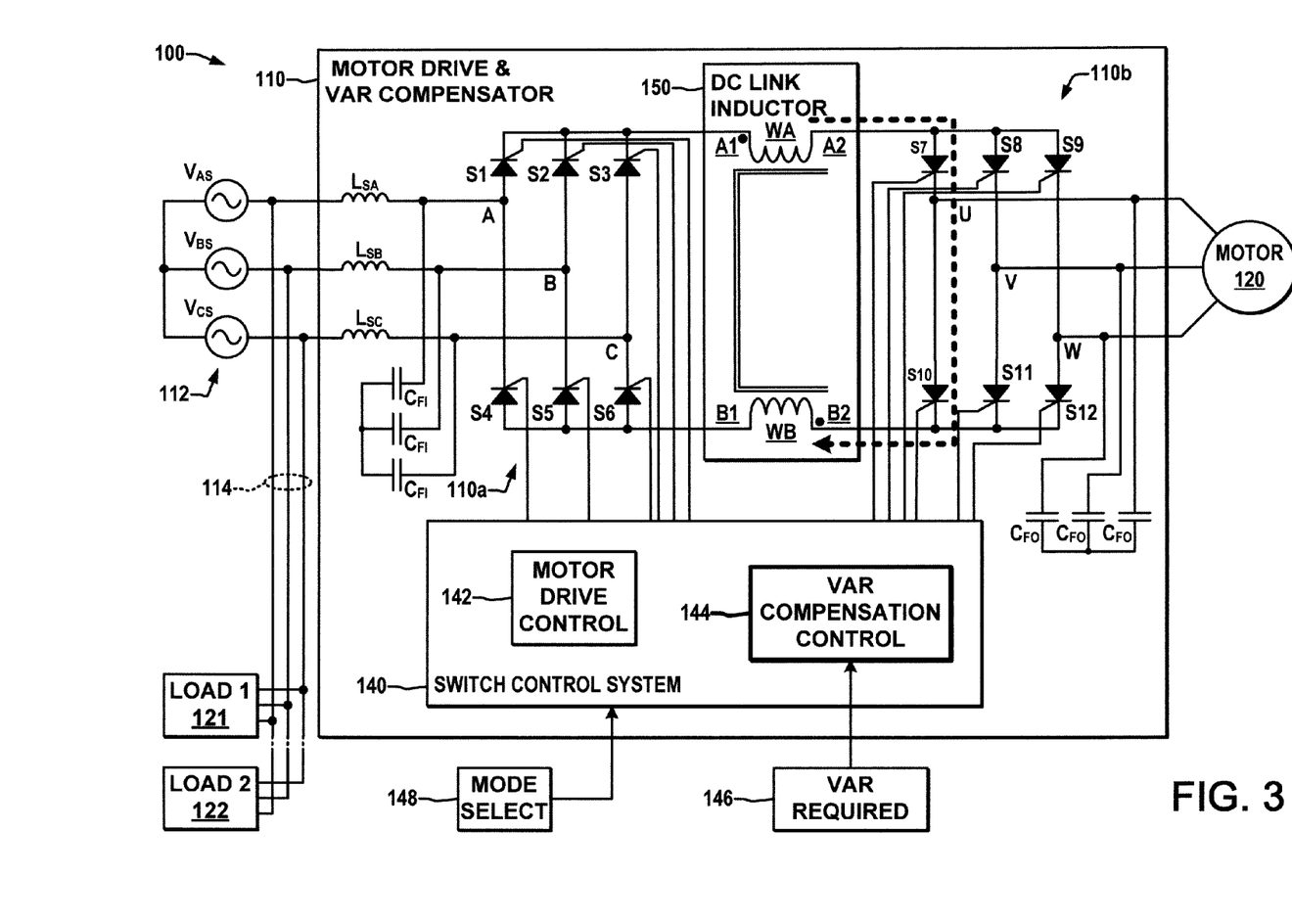
FIG. 3 is a schematic diagram illustrating the motor drive of FIG. 2 operating in a VAR compensation mode in accordance with the disclosure.

Referring also to FIGS. 2 and 3, further details of the exemplary motor drives 110 are illustrated, in which line side and machine (load) side switching converters 110a and 110b, respectively, are operated by a dual mode switch control system 140 for either motor drive operation (with or without local power factor compensation) or for off-line VAR compensation operation when the motor 120 is not being used (de-energized). In the example of FIGS. 2 and 3, a three-phase AC power source 112 provides electrical power to the motor drive 100 and other loads 121 and 122 connected to a common AC power connection point or bus 114. The present disclosure may be advantageously employed in association with single-phase implementations, as well as multi-phase systems having three or more power lines. The system 100 and the source 112 thereof, moreover, may be operated at any suitable source frequency with the motor drives 110 being adapted to receive and convert the input AC power at the supply frequency, wherein the disclosure is not limited to the three-phase embodiment of FIGS. 2 and 3.

The CSI-type medium voltage drive 100 is operable in a first (motor drive) mode to drive a motor load 120 by converting three-phase AC electrical power from the input source 112 to three-phase AC output power used to drive the AC motor 120. In this example, the AC input power is switched by a first set of switches S1-S6 constituting a line side converter 110*a* in the form of a switching regulator circuit or stage to create an intermediate DC bus current and a machine side converter 110*b* comprises a second set of switches S7-S12 forming a CSI switching inverter stage that selectively switches the DC power to provide AC power to an motor load output for providing drive current to the leads of the motor 120, with an intermediate circuit 150 including a DC link choke or inductor linking the first and second sets of switches and providing forward and reverse current paths between the line side converter 110*a* and the machine or load side converter 110*b*. The inductor of the intermediate circuit 150 includes a first winding WA in a forward or positive DC path having a first end A1 connected to the upper line side converter switches S1-S3 and a second end A2 coupled with the upper output switches S7-S9 of the machine side converter 110*b*, along with a second winding WB in a negative or return DC path with a first end B1 coupled to the lower line side converter switches S4-S6 and a second end B2 coupled to the lower output switches S10-S12 of the machine side converter 110*b*.

The switching devices S1-S6 and S7-S12 may be any suitable controllable electrical switch types (e.g., thyristors, IGBTs, etc.) that are controlled according to any suitable type or form of switching scheme or schemes, such as phase control, pulse width modulation, etc., in open or closed-loop fashion. In the drive 110, moreover, line and machine side switching control signals are provided to the individual switches S1-6 and S7-S12, respectively, from the switch control system 140 in order to implement a given power conversion task, where the controller 140 may be provided with one or more setpoint desired values and one or more feedback signals or values by which the output power or VAR compensation are controlled. In the illustrated embodiments, for example, the switch control system 140 provides inputs for receiving a mode select signal or value 148, as well as a VAR required input signal or value 146, which may be in any suitable form such as an electrical signal, digital data, etc., and which may be received from any suitable source, such as an external network, switches, a user interface provided on the drive 110, or other suitable source(s).

In one embodiment, the mode select input receives a mode selection signal 148 from a drive-mounted switch or from an external network or other device, which indicates whether the drive 110 is to operate in the first (motor drive) mode with the switching control signals being provided by the controller 140 according to a motor drive control component 142, or a second (VAR compensation) mode in which the controller 140 provides the switching control signals according to a VAR compensation control component 144 to operate the machine side converter 110*b* so as to prevent power transfer between the intermediate circuit 150 and the motor load output 120 while operating the line side converter 110*a* to control a voltage or current in the intermediate circuit 150 to achieve the desired VAR compensation for the system 100. In the second operational mode, moreover, the controller 140 optionally receives a VAR required input 146 and operates the line side converter stage 110*a* accordingly. The switch control system 140 and the motor drive and VAR compensation control components thereof may be any suitable hardware, software, firmware, logic, or combinations thereof that are adapted to implement the functions illustrated and described herein.

The exemplary motor drive 110, moreover, includes optional line reactors $L_{SA}$, $L_{SB}$, and $L_{SC}$ connected in series between the input phase sources $V_{AS}$, $V_{BS}$, and $V_{CS}$ (112) and corresponding switch circuit input nodes A, B, and C, respectively, of the line side converter 110*a*, as well as optional input line filter capacitors $C_{FI}$ wye-coupled to the input nodes A, B, and C. In addition, the exemplary drive 110 may also optionally include output filter capacitors $C_{FO}$ connected along the output lines U, V, and W, although not a requirement of the present invention.

In the first (motor drive) operational mode (FIG. 2), three-phase AC power from the input power source 112 is provided to the line side converter stage 110*a* and the controller 140 generates the appropriate line side switching control signals to selectively activate the first set of switches S1-S6 in order to generate DC power on a DC bus in the intermediate circuit 150. DC power from the intermediate circuit 150 is then converted to AC motor power via the machine side converter 110*b* connected to the second winding ends A2 and B2 in which the switches S7-S12 receive machine side switching control signals from the controller 140 in order to provide AC power of appropriate amplitude, frequency, and phase to the motor 120 in a controlled fashion according to the motor drive control scheme 142. The motor drive control 142 may be any suitable switch control form for the line and machine side converter switching, such as phase control, pulse width modulation, etc.

Figure 4:
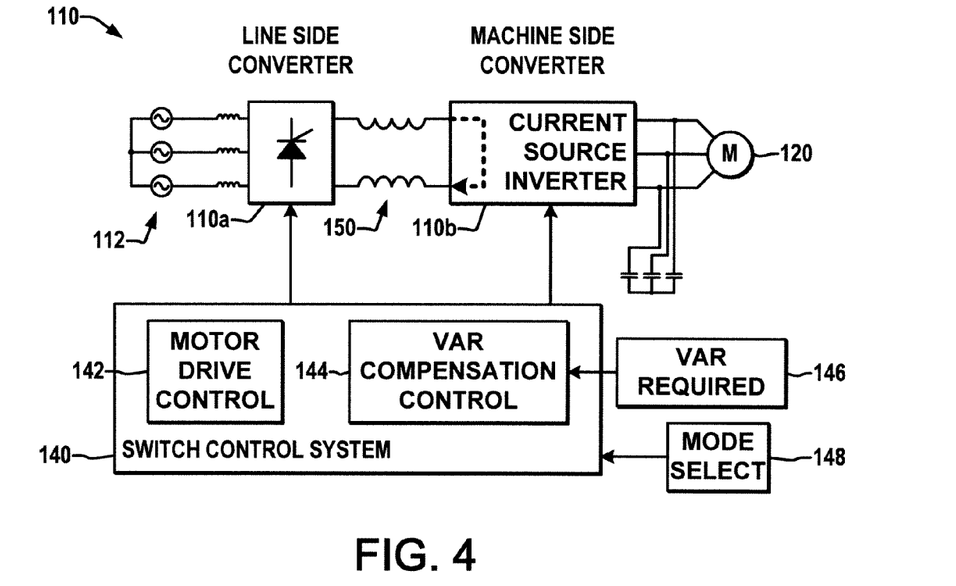
FIG. 4 is a schematic diagram illustrating a CSI-type motor drive with VAR compensation apparatus in accordance with the present disclosure.

Referring also to FIGS. 3 and 4, FIG. 3 shows operation of the drive 110 in the second mode for VAR compensation according to the compensation control component 144, which can be any form of open or closed loop switching scheme in which the line side and machine side switching control signals are provided to prevent power transfer between the intermediate circuit 150 and the output while providing the line side switching control signals to selectively couple the AC power input to the intermediate circuit 150 to implement system VAR compensation. In this regard, the control system 140 may receive one or more compensation setpoint values via the VAR required input 146, and may optionally be provided with system power factor feedback from external or internal sources (not shown), such as voltages, currents, phase angle information, etc., for closed loop VAR compensation based at least in part on the VAR required input 146. In one example, the VAR required input may specify (e.g., based on current power factor conditions in the system 100) that 100 VAR leading is required of the drive 110, wherein the switch control system 140 is operative to provide the appropriate line side switching control signals to provide this level of VAR compensation. Where two or more VAR compensation capable motor drives 110 are connected to the system 100, moreover, an external device may provide different VAR compensation requirement inputs to different off-line drives so as to achieve an overall VAR compensation strategy, for instance, where a particular drive 110 has known available compensation VAR capabilities.

In the exemplary CSI-based drive 110, moreover, the switch control system 140 provides the switching control signals to the machine side converter 110*b* in the second operating mode to cause the machine side converter 110*b* to provide a short circuit between the forward and return current paths of the intermediate circuit 150 in order to route the current through the converter 110*b* from the forward path directly to the return path of the intermediate circuit 150, thereby preventing power transfer between the intermediate circuit 150 and the output (the motor 120 remains de-energized). In this regard, the machine side switching control signals may be such that one, some, or all of the machine side converter switch pairs S7/S10, S8/S11, and/or S9/S12 are concurrently switched on during the VAR compensation mode operation of the drive 110. Dedicated short circuiting switches (or other physical means of short circuit) may alternatively be provided in the machine side converter 110*b* for this purpose, which are actuated by the switch control system 140 when the VAR compensation mode is selected. While this machine-side converter short circuit condition is maintained in the second mode, the switch control system 140 provides switching control signals to the line side converter 110*a* to control the amplitude of the current circulating through the intermediate circuit 150 in order to provide VAR compensation to the system 100 as a whole.

FIG. 4 shows a CSI-type motor drive with VAR compensation apparatus in accordance with the present disclosure, wherein the line side converter 110*a* and machine side converter are switching converters operable according to switching control signals from a dual mode switch control system 140 as described above. As shown in FIG. 4, in the second (VAR compensation) mode of operation, the switching of the CSI machine side converter 110*b* creates a short circuit across the output so as to divert current from the forward intermediate circuit current path directly to the return path without providing any power to the motor 120, while the line side converter 110*a* is switched so as to provide VAR compensation to the overall power system.

Figure 5:
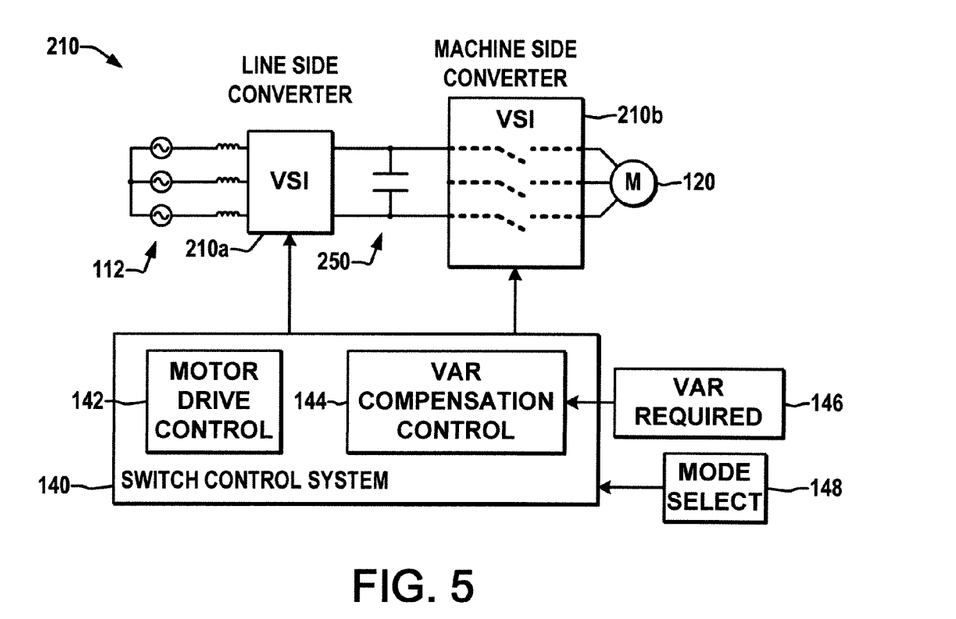
FIG. 5 is a schematic diagram illustrating a VSI-type motor drive with VAR compensation apparatus in accordance with the present disclosure.

Referring now to FIG. 5, the various aspects of the disclosure are further applicable with respect to voltage source inverter (VSI) type AC motor drives. FIG. 5 shows a VSI-type motor drive 210 with VAR compensation apparatus in accordance with the present disclosure, including a VSI line side switching converter 210*a* operable according to line side switching control signals from a switch control system 140 to convert input AC power to provide a DC bus voltage in an intermediate circuit 250 that includes a capacitor coupled between a forward and a return current path of the circuit 250. The DC bus voltage of the circuit 250 is provided to a VSI-type machine side switching converter 210*b* which is operated by appropriate machine side switching control signals from the switch control system 140 to selectively provide drive power to the motor load 120 in a first operational mode or to prevent power from reaching the motor 120 in a second (VAR compensation) mode in accordance with the present disclosure. In this VAR compensation mode, the VSI machine side converter 210*b* is provided with switching signals from the controller 140 such that the motor load output is disconnected from the intermediate circuit 250, thereby preventing power transfer between the intermediate circuit 250 and the output. In the VAR compensation mode, moreover, the switch control system 140 provides the line side switching control signals to the converter 210*a* to control the amplitude of the voltage across the capacitor in the intermediate circuit 250, based at least partially on the VAR required input 146 in one embodiment.

Figure 6:
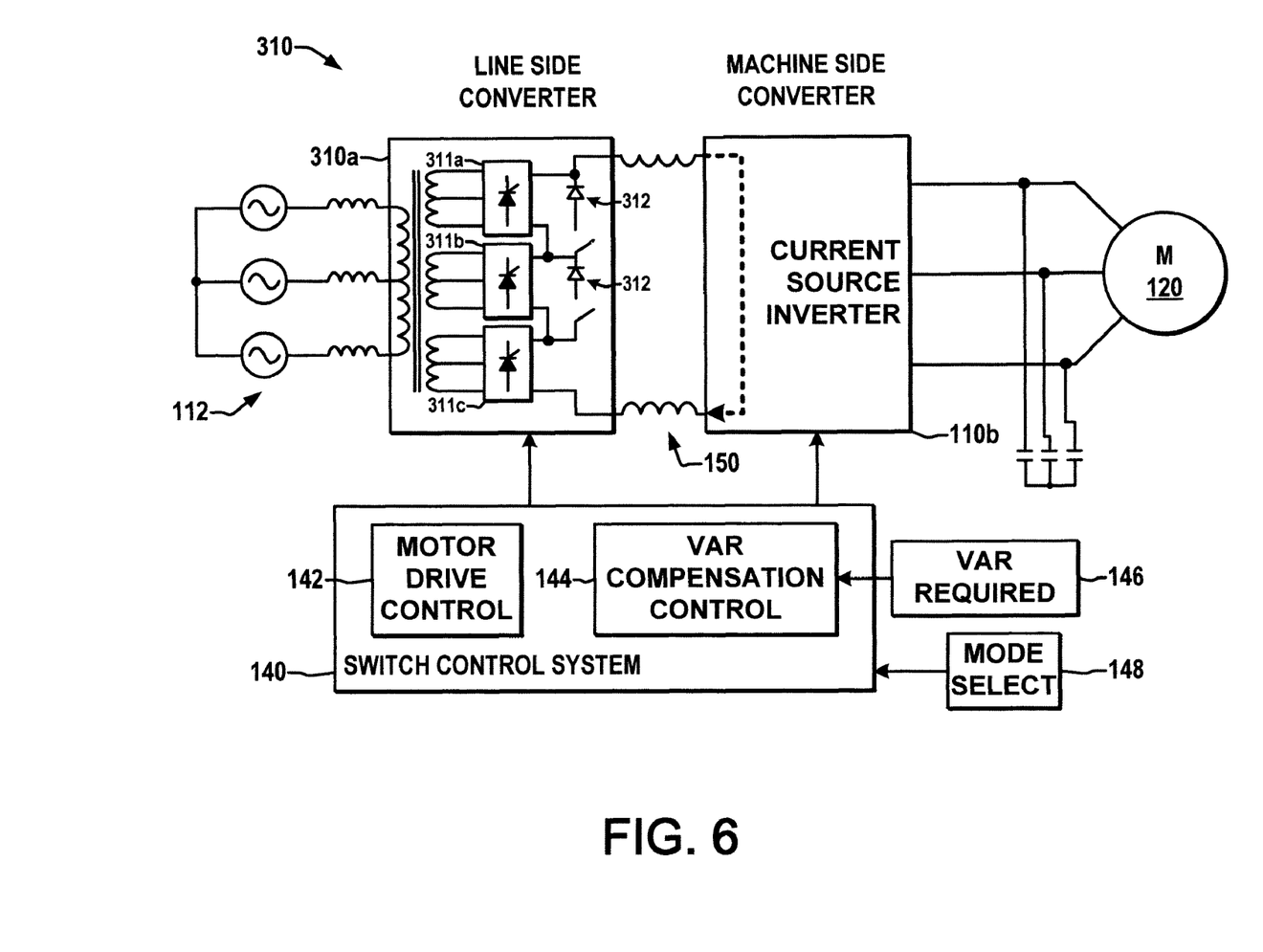
FIG. 6 is a schematic diagram illustrating another CSI-type motor drive with an 18 pulse thyristor bridge rectifier with VAR compensation apparatus in accordance with the present disclosure.

Referring now to FIG. 6, another exemplary CSI-type motor drive 310 is illustrated, in which the line side converter 310*a* is comprised of an 18 pulse thyristor bridge rectifier including three series-connected six-pulse thyristor bridges 311*a*-311*c* coupled to phase-shifted secondary windings of an isolation transformer, with the transformer primary being connected to the power source 112. In this embodiment, the individual thyristor bridges include upper and lower sets of three thyristors whose switching action is controlled via switching control signals from the control system 140 to selectively connect the phase power lines with the upper or lower current paths of the intermediate circuit 150. The illustrated 18 pulse line side converter 310*a*, moreover, is provided with diodes 312 and two switches for improved power factor control during motor drive operation, and which may facilitate VAR compensation control performance of the drive 310 in accordance with the present disclosure.

Figure 7:
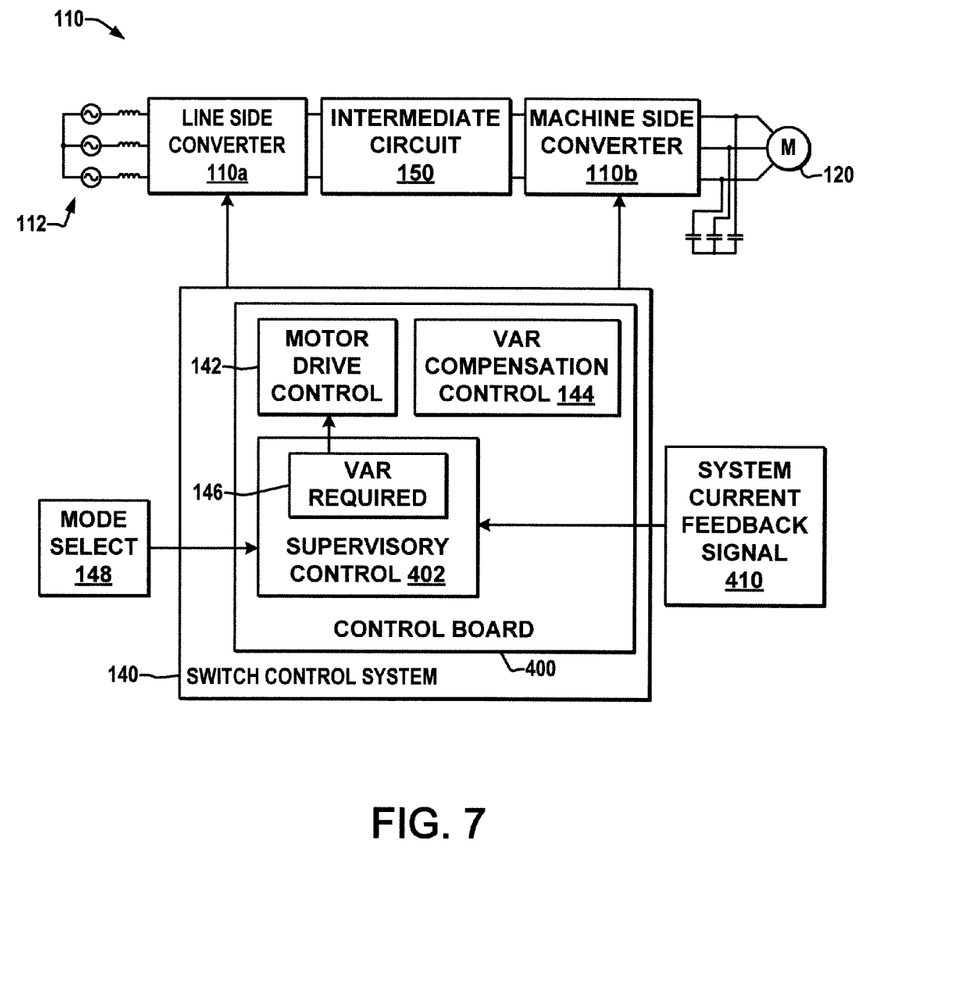
FIG. 7 is a schematic diagram showing another embodiment in which the VAR compensation control component and the motor drive component are implemented in a single integrated control board including a supervisory control component receiving a mode select input and an external system current feedback signal and generating a VAR required control signal for use in VAR compensation mode.

FIG. 7 illustrates yet another embodiment of the present disclosure in which the drive 110 includes a line side converter 110*a*, and intermediate circuit 150, a machine side converter 110*b*, and a switch control system 140 as described supra. As with the above described embodiments, the motor drive 110 of FIG. 7 is operable in a first motor drive mode and in a second VAR compensation mode according to an external mode select signal 148. In this embodiment, moreover, the switch control system 140 includes a control board, such as a processor or logic-based circuit board 400 with appropriate programmable or configurable hardware and software to implement both the VAR compensation control component 144 and the motor drive component 142. The control board 400 may optionally include a supervisory control component, such as a software or firmware module 402 that receives an externally provided system current feedback signal 410 (e.g., an analog signal, or digital value, or other form of data or information indicating a system current). In this configuration, the supervisory control 402 of the drive 110 provides for on-board computation of the VAR required value 146 based at least partially on the system current feedback signal value 410, and the computed VAR required value 146 is used in controlling the amount of compensatory VARs generated or consumed by the drive 110 when operated in the VAR compensation mode.

The VAR compensation and AC motor drive control components 144 and 142 can thus be implemented in integrated fashion in a single control board, server, processor, etc., by which a unitary input system power factor and motor control device is achieved in the drive 110. The current feedback 410 from the overall system can be derived or obtained in one example as an indication of the line current 16 of the power system 12 as shown above in FIG. 1.

As shown in the example of FIG. 1, moreover, multiple VAR compensation enabled AC motor drives 110 be provided with such a system current feedback signal or value 410, or a single control element (separate from the drives 110 or incorporated into one of the drives 110) can provide VAR required signals to each of the drives 110 for coordinated overall system VAR compensation alone or in combination with motor control. In this regard, a supervisory control element (e.g., the on-board supervisory control component 402 in FIG. 7) could receive the system current feedback value 410 and determine based on the status of each ac drive (e.g., motor control or VAR compensation) what switching combination and power factor should be provided as a VAR required setpoint to each drive 110. In this manner, for example, if the total VAR required or demand value at a given point in time is 1000 (e.g., 1 KVAR), a first ac drive could be running its motor, but also provide 100 VAR compensation while the second (e.g., off-line) AC drive may de-energize its motor and provide 900 VAR. In this manner, the provision of selective VAR compensation and motor drive functionality in each drive 110 provides an effect and flexible overall system solution without necessitating external (dedicated) SVCs.

Further aspects of the present disclosure provide a VAR compensation method in a power system using an AC motor drive (e.g., drives 110, 210 above) that has a line side converter (converters 110*a*, 210*a*) connected between an input and an intermediate circuit (circuits 150, 250) along with a machine side converter (converters 110b, 210b above) connected between the intermediate circuit and a motor load output. The method comprises operating the machine side converter to prevent power transfer between the intermediate circuit and the motor load output, and operating the line side converter to control a voltage or current in the intermediate circuit. In one implementation, the machine side converter operation provides a short circuit between forward and return current paths of the intermediate circuit, and the line side converter operation provides for controlling a current in the intermediate circuit based at least partially on a received VAR required input, such as in the CSI-based drive examples above. In another implementation, the machine side converter operation involves causing the machine side converter to disconnect the motor load output from the intermediate circuit, with the line side converter being operated at least partially according to a received VAR required input to control a voltage in the intermediate circuit, such as in the VSI drive example of FIG. 5 above. The method may further include receiving a mode selection signal, where the line side and machine side converters are selectively operated for motor drive or VAR compensation operation based on the mode selection signal.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. An AC motor drive, comprising:
   an input for receiving AC input electrical power from an AC power source;
   an output for providing output electrical power to an electric motor load;
   an intermediate circuit comprising:
   at least one storage element,
   a forward current path between the line side converter and the machine side converter,
   a return current path between the line side converter and the machine side converter, and
   at least one link inductor storage element connected in one of the forward and return current paths of the intermediate circuit;
   a line side converter comprising a plurality of switching devices coupled with the input and the intermediate circuit and operative according to a plurality of line side switching control signals to selectively provide power from the input to the intermediate circuit;
   a machine side converter comprising a plurality of switching devices coupled with the intermediate circuit and the output and operative according to a plurality of machine side switching control signals to selectively provide power from the intermediate circuit to the output, wherein the machine side converter is a current source inverter; and
   a switch control system operatively coupled with the line side and machine side converters to provide the line side converter switching control signals and the machine side switching control signals, the switch control system being operative in a first operating mode to provide the line side and machine side switching control signals to selectively provide power to the electric motor load according to a motor drive control scheme, and the switch control system being operative in a second operating mode to provide the machine side switching control signals to prevent power transfer between the intermediate circuit and the output and to provide the line side switching control signals to selectively couple the input to the intermediate circuit according to a VAR compensation scheme, wherein the switch control system receives a VAR required input, wherein the switch control system provides the line side switching control signals in the second operating mode based at least partially on the VAR required input, and wherein the switch control system provides the machine side switching control signals in the second operating mode to cause the machine side converter to provide a short circuit between the forward and return current paths to prevent power transfer between the intermediate circuit and the output.

2. The motor drive of claim 1, wherein the switch control system comprises a mode select input operative to receive a mode selection signal and wherein the switch control system is operative to selectively generate the switching control signals for motor drive or VAR compensation operation according to the mode selection signal.

3. The motor drive of claim 1, wherein the input comprises:
   first and second input current paths between the AC power source and the line side converter; and
   at least one line reactor connected in one of the first and second input current paths between the AC power source and the line side converter.

4. The motor drive of claim 3, wherein the input comprises:
   first and second input current paths between the AC power source and the line side converter; and
   at least one filter capacitor connected between the first and second input current paths between the AC power source and the line side converter.

5. The motor drive of claim 1, wherein the input comprises:
   first and second input current paths between the AC power source and the line side converter; and
   at least one filter capacitor connected between the first and second input current paths between the AC power source and the line side converter.

6. A power conversion system, comprising:
   an input for receiving input electrical power from a power source;
   an output for providing output electrical power to a load;
   an intermediate circuit comprising at least one storage element, wherein the intermediate circuit comprises: a forward current path between the line side converter and the machine side converter, a return current path between the line side converter and the machine side converter, and at least one link inductor storage element connected in one of the forward and return current paths of the intermediate circuit;

a line side converter comprising a plurality of switching devices coupled with the input and the intermediate circuit and operative according to a plurality of line side switching control signals to selectively provide power from the input to the intermediate circuit, wherein the machine side converter is a current source inverter;

a machine side converter comprising a plurality of switching devices coupled with the intermediate circuit and the output and operative according to a plurality of machine side switching control signals to selectively provide power from the intermediate circuit to the output; and a switch control system operatively coupled with the line side and machine side converters to provide the line side converter switching control signals and the machine side switching control signals, the switch control system being operative in a first operating mode to provide the line side and machine side switching control signals to selectively provide power to the load according to a control scheme, and the switch control system being operative in a second operating mode to provide the machine side switching control signals to prevent power transfer between the intermediate circuit and the output and to provide the line side switching control signals to selectively couple the input to the intermediate circuit according to a VAR compensation scheme;

wherein the switch control system provides the machine side switching control signals in the second operating mode to cause the machine side converter to provide a short circuit between the forward and return current paths to prevent power transfer between the intermediate circuit and the output.

7. The power conversion system of claim 6, wherein the switch control system provides the line side switching control signals in the second operating mode to control an amplitude of current circulating through the intermediate circuit.

8. A method of providing VAR compensation in a power system using an AC motor drive having a line side converter connected between a motor drive power input and an intermediate circuit and a machine side converter connected between the intermediate circuit and a motor load output, the method comprising:

operating the line side and machine side converters in a first operating mode to selectively provide power to an electric motor load coupled to the motor load output;

operating the machine side converter in a second operating mode to prevent power transfer between the intermediate circuit and the motor load output by causing the machine side converter to provide a short circuit between forward and return current paths of the intermediate circuit; and operating the line side converter in the second operating mode to control a current in the intermediate circuit.

9. The method of claim 8, further comprising receiving a VAR required input from an external source, wherein the line side converter is operated to control the current in the intermediate circuit based at least partially on the VAR required input.

10. The method of claim 8, further comprising receiving a VAR required input from an external source, wherein the line side converter is operated to control a current in the intermediate circuit based at least partially on the VAR required input.

11. The method of claim 8, further comprising receiving a mode selection signal, wherein the line side and machine side converters are selectively operated for motor drive or VAR compensation operation according to the mode selection signal.

12. The method of claim 8, further comprising:
receiving a system current feedback signal from an external source; and
generating a VAR required signal in the AC motor drive based at least partially on the system current feedback signal;
wherein the line side converter is operated to control a in the intermediate circuit based at least partially on the VAR required signal.

13. A computer readable media with computer executable instructions for providing VAR compensation in a power system using an AC motor drive having a line side converter connected between a motor drive power input and an intermediate circuit and a machine side converter connected between the intermediate circuit and a motor load output, the computer readable media comprising computer executable instructions for:

operating the line side and machine side converters in a first operating mode to selectively provide power to an electric motor load coupled to the motor load output;

operating the machine side converter in a second operating mode to prevent power transfer between the intermediate circuit and the motor load output by causing the machine side converter to provide a short circuit between forward and return current paths of the intermediate circuit; and operating the line side converter in the second operating mode to control a current in the intermediate circuit.

* * * * *